Oct. 21, 1952 L. W. STORM 2,614,793
ONE-WAY SEAL
Filed Dec. 23, 1948 4 Sheets-Sheet 1

Inventor
Lynn W. Storm
By
E. V. Hardway,
ATTORNEY.

Oct. 21, 1952 L. W. STORM 2,614,793
ONE-WAY SEAL
Filed Dec. 23, 1948 4 Sheets-Sheet 2

Inventor
Lynn W. Storm

By
E. V. Hardway,
ATTORNEY.

Oct. 21, 1952 L. W. STORM 2,614,793
ONE-WAY SEAL
Filed Dec. 23, 1948 4 Sheets-Sheet 3

Inventor
Lynn W. Storm

By
E. V. Hardway,
ATTORNEY.

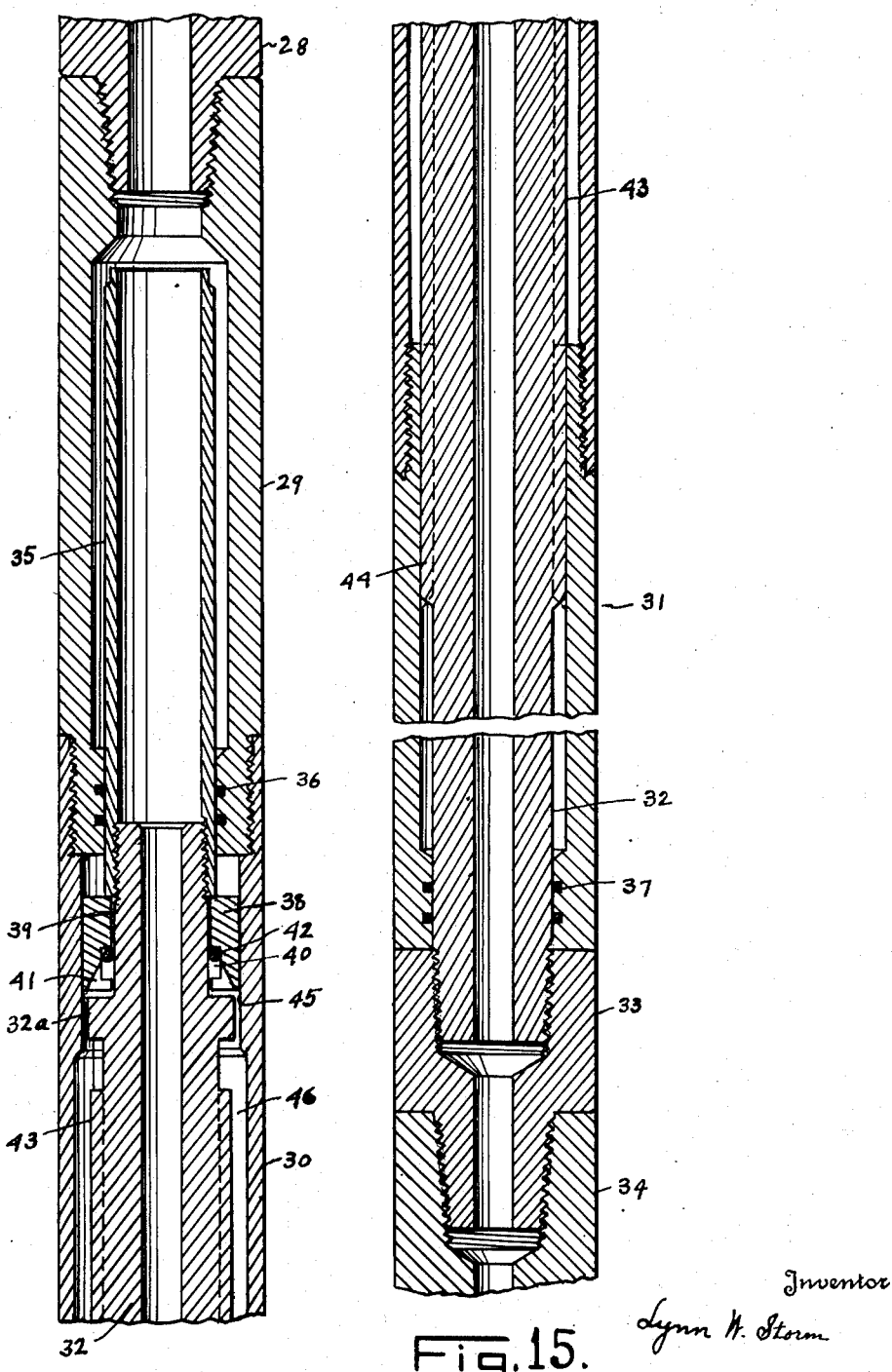

Patented Oct. 21, 1952

2,614,793

UNITED STATES PATENT OFFICE 2,614,793

ONE-WAY SEAL

Lynn W. Storm, Houston, Tex.

Application December 23, 1948, Serial No. 66,911

7 Claims. (Cl. 251—119)

This invention relates to a one way seal.

An object of the invention is to provide a seal between either plane or cylindrical surfaces whether the parts between which the seal is located are relative movable or stationary with respect to each other.

The construction is such that fluid to be controlled may readily move between the parts in one direction but will automatically seal between the parts to prevent movement of the fluid in the other direction.

More specifically the invention embodies a seal ring which is seated in one of said parts which will form a seal between the parts upon the application of fluid pressure thereto in one direction with suitable relief passageways provided in the assembly to allow movement of the fluid between the parts in the other direction.

The invention also includes yieldable means in association with the seal ring to assist in maintaining the seal ring in sealing position or in returning it to said position after it has been moved to inactive, or by-passing, position.

The invention is particularly useful in sealing between a piston and cylinder and in one of the illustrations disclosed has been shown embodied in a well tool commonly known as a jar for releasing stuck objects from wells.

Other objects and advantages will be apparent from the following specification which is illustrated by the accompanying drawings, wherein.

Figure 9:
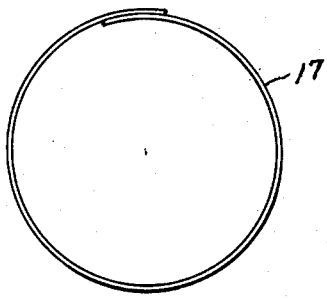
Figure 10:
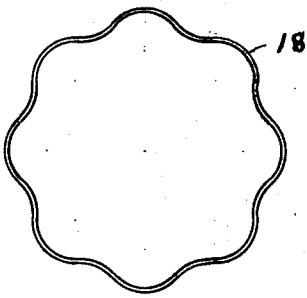

Figures 9 and 10 form side views of assisting springs employed.

Figure 11:
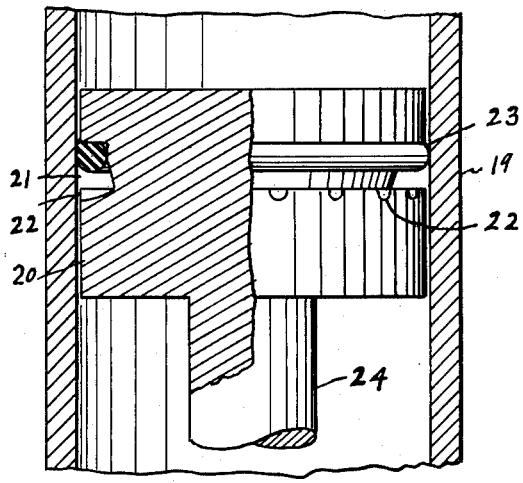

Figure 11 illustrates the invention as applied to a piston and cylinder.

Figure 12:
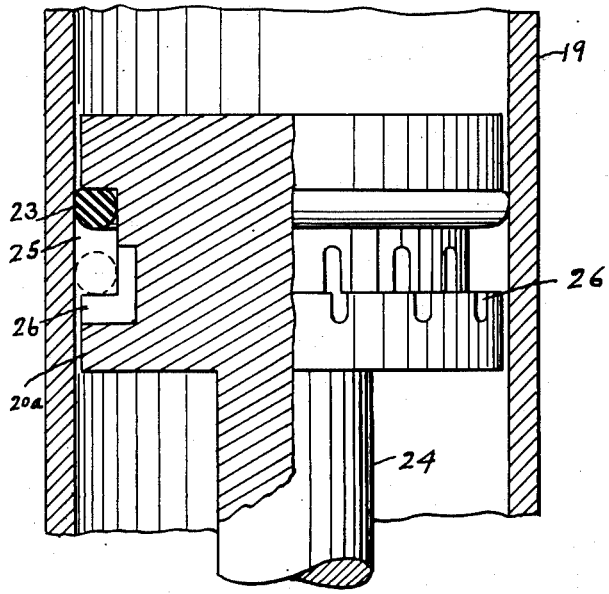

Figure 12 is a fragmentary, sectional view illustrating another embodiment of the invention disclosed in Figure 11.

Figure 13:
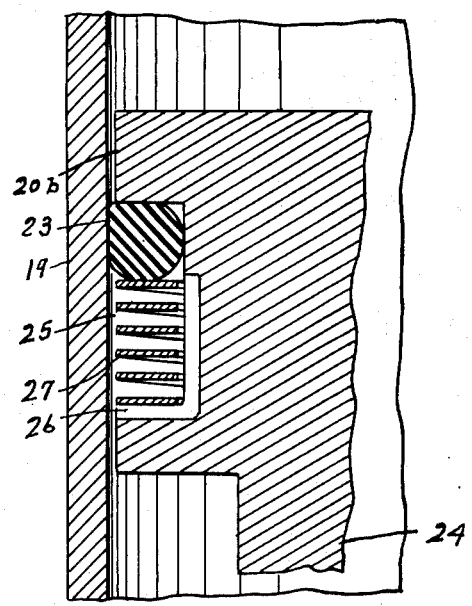

Figure 13 is a fragmentary, sectional view of another embodiment of the invention illustrated in Figure 12.

Figure 14 is a sectional view of the upper end of a jarring tool embodying the invention and Figure 15 is a sectional view of the lower end of said jarring tool.

Referring now more particularly to the drawings the numeral 1 designates a cylinder which, in the present illustration has a liner 2.

Reciprocable in this cylinder there is a piston 3 which is provided with a piston rod 4.

In the illustration referred to the piston and piston rod are tubular and on the piston rod and spaced from the end of the piston there is an annular flange 5 which is maintained in place by means of a connecting rod, as 6, threaded onto the piston rod and in abutting relation with said flange.

Around the piston rod 4 and between the piston 3 and the flange 5 there is a sleeve 7 which fits closely within the cylinder but which is spaced from the piston rod and which also has a clearance between the piston and the flange 5.

The sleeve 7 has an end groove 8 in which there is located a seal ring 9 formed of rubber or other suitable material.

Figure 1:
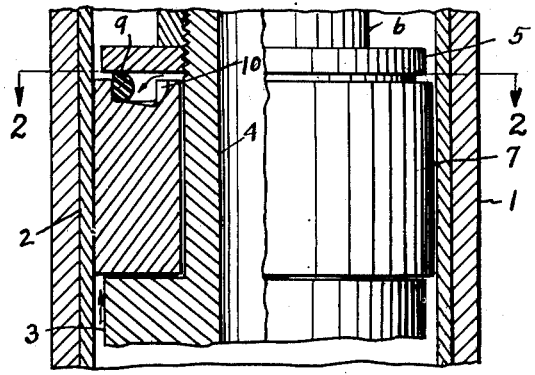
Figure 1 is a fragmentary, vertical, sectional view of the invention as applied to a piston and cylinder assembly.

When the pressure of fluid about the piston is in the direction indicated by the arrow in Figure 1 said pressure fluid will pass between the piston and cylinder and thence between the piston and piston rod on the one hand and the sleeve 7 on the other hand will enter the groove 8 through radial passageways 10 provided in the end of said sleeve and this pressure will force the ring outwardly into the position indicated in Figure 1 thus forming a seal to stop the flow of fluid; but when the fluid pressure is in the opposite direction the seal ring 9 will be forced inwardly, or contracted, so as to allow the pressure fluid to pass through the passageways 10, the seal ring 9 thus, in effect, forming a valve.

Figure 2:
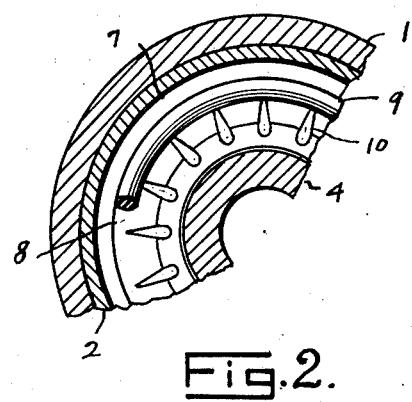
Figure 2 is a fragmentary, cross-sectional view thereof taken on the line 2—2 of Figure 1.
Figure 3:
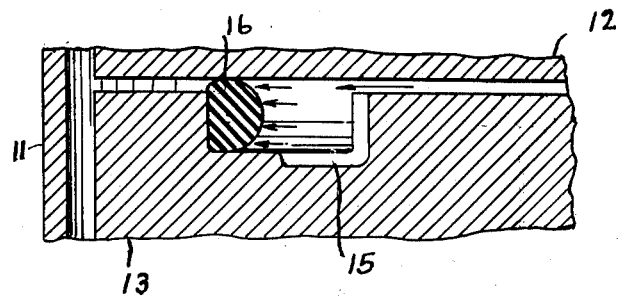
Figure 3 is a fragmentary, sectional view of another embodiment of the invention showing the seal ring in sealing position.
Figure 4:
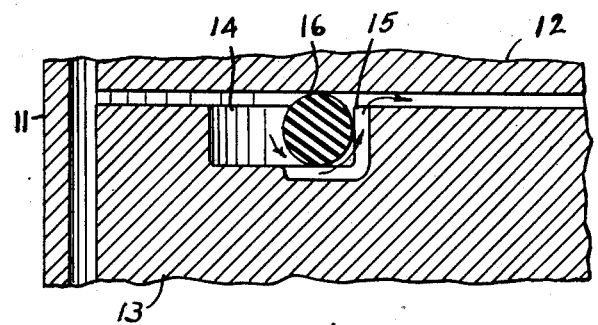
Figure 4 is a fragmentary, sectional view, as shown in Figure 3, showing the seal ring in by-passing position.
Figure 5:
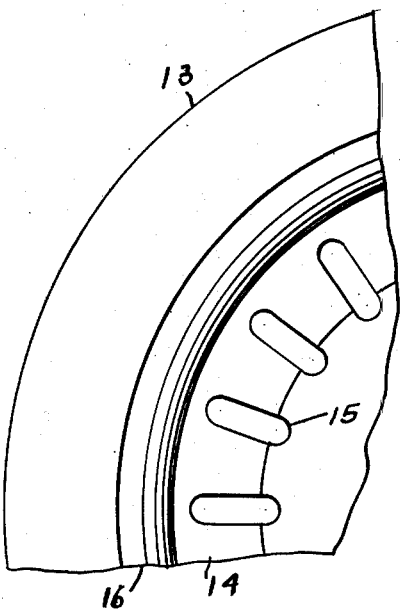
Figure 5 is a fragmentary, plan view illustrating the seal ring groove and by-passes of the types shown in Figures 3 and 4.

In the embodiment of the invention shown in Figures 3 to 5, inclusive, wherein there is disclosed a cylinder 11 and fixed part 12, corresponding to the flange 5 shown in Figure 1, and a co-operating part 13 corresponding to the part 7 in Figure 1, the same type of valve is disclosed as shown in Figures 1 and 2. In this embodiment the end of the part 13, adjacent the part 12 is provided with an annular groove 14 having the inwardly directed radial passageways 15 with a seal ring 16 in the groove which is formed of resilient material, such as rubber.

When the pressure fluid is operating in the direction indicated by the arrows in Figure 3, that is radially outwardly against the seal ring 16, said ring will be forced outwardly and be deformed as shown in said last mentioned figure to close the passageway between the parts 12 and 13 to prevent the flow of said fluid; but when the pressure fluid is operating in the opposite direction, as indicated by the arrows in Figure 4, the seal ring 16 will be forced inwardly so as to clear the passageways 15 to allow the fluid to pass, said seal ring 16, in this instance, also acting as a valve.

Figure 6:
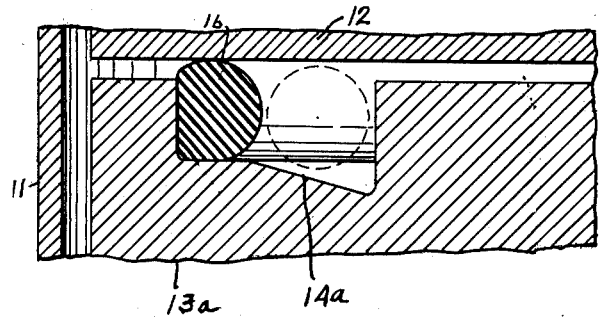
Figure 6 is a fragmentary, sectional view of a slightly modified form of views shown in Figures 3-5 showing the seal ring in sealing position.
Figure 7:
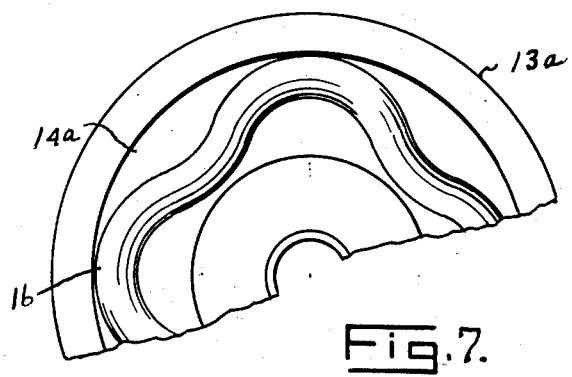
Figure 7 is a partial plan view thereof illustrating the seal ring in by-passing position.

Referring now more particularly to Figures 6 and 7, there is shown the cylinder 11 and the fixed part 12 with a co-operating part 13a. The end of the part 13a adjacent the part 12 is formed with an annular groove 14a which is not only widened radially but which is also gradually deepened inwardly and longitudinally of the part 13a to form a by-pass so that as the seal ring 16, in said groove, is contracted inwardly there will be ample space for the passage of the pressure fluid around said seal ring.

Upon radial outward movement of the pressure fluid, as indicated by the arrows in Figure 3, the seal ring 16 shown in Figure 6 will be forced outwardly against the outer wall of the groove 14a and will be expanded against the part 12, as shown, so as to form a seal to prevent the passage of pressure fluid; but when the pressure of the fluid is in the opposite direction the seal ring 16 will be contracted into the position shown in dotted lines in Figure 6 and in full lines in Figure 7 so as to allow the fluid, under pressure, to pass, said seal ring in this instance also forming a valve. As the seal ring 16 is forced radially inwardly it will assume a sinuous shape, as shown in Figure 7, but will not interfere with the passage of the fluid under pressure.

Figure 8:
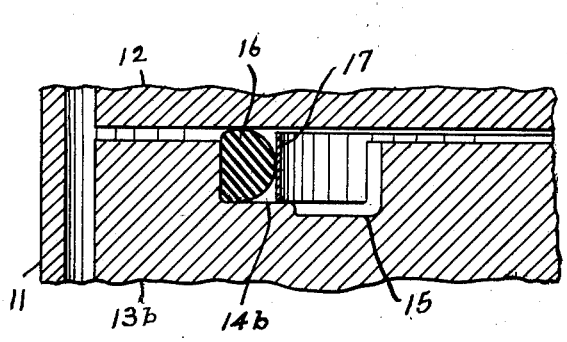
Figure 8 is a fragmentary, sectional view of the form shown in Figures 3 and 4 wherein the seal ring is assisted by a mechanical expansion spring.

In the form illustrated in Figure 8 there is a seal ring 16 in the annular groove 14b in the end of the part 13b adjacent the part 12 and this seal ring may be reinforced, if necessary, by the resilient split ring 17, fitted within the resilient ring 16 or by the sinuous but continuous resilient ring 18, shown in Figure 10. These rings 17 and 18 may be formed of steel or other suitable flexible material.

The groove 14b, shown in the end of the part 13b, is slightly different in shape from the groove 14a in that it is not widened inwardly but is provided with spaced passageways, as illustrated in Figures 4 and 5.

Referring to Figures 11, 12 and 13 there is shown a cylinder 19 with the solid pistons 20, 20a and 20b therein which are spaced from the cylinder walls to provide a fluid passageway.

The piston 20 is provided with an external annular groove 21 which is widened inwardly and whose widened end is provided with passageways 22 leading outwardly therefrom. Within the groove 21 there is a seal ring 23 formed of rubber or other suitable resilient material.

The pistons are fixed on the ends of suitable piston rods 24.

In the forms shown in Figures 12 and 13 there is an annular external seal ring groove 25 around each piston of uniform dimensions and which have the spaced outlet passageways 26 leading outwardly from the inner side thereof, as shown in Figures 12 and 13, and in each of said grooves 25 there is the seal ring 23. In each of the Figures 11, 12 and 13, upon application of pressure fluid in one direction the seal ring will be moved into the position indicated in each of the figures and deformed under the influence of said pressure to form a seal between the piston and cylinder to prevent the passage of said pressure fluid, and in this connection the form illustrated in Figure 13 is provided with a spiralled spring 27 within the groove 25 and which normally acts against the seal ring 23 to hold it in sealing position.

Upon the pressure fluid being applied in the opposite direction the seal ring will be moved in the opposite direction so as to open the passageways 22 or 26, as the case may be, to permit free passage of said fluid under pressure.

As illustrated in Figures 14 and 15 the numeral 28 designates a string of drill pipe having a pin at its lower end which may be threaded into the upper end of the tubular barrel 29. Connected to the lower end of the barrel there is a tubular body preferably formed of upper and lower sections 30 and 31.

Working axially through the body there is a tubular piston stem 32 and its lower end is threaded into a tubular coupling 33 to which any suitable type of grapple 34 may be attached.

The piston stem extends up through the barrel and threaded onto the upper end there is a wash pipe 35 which extends up into the barrel 29.

The piston stem 32 and wash pipe 35 move as a unit which is sealed with the lower end of the barrel by the annular seal rings 36 between them and with the lower end of the body by means of the seal rings 37 between them.

The upper end of the piston stem is enlarged in external diameter forming a piston head 32a and above said head, beneath the lower end of the wash pipe 35 there is a piston 38. This piston is loosely mounted on the piston stem, there being a passageway 39 between them and the lower end of the piston is formed with an internal annular groove 40 whose lower end has the downwardly and outwardly spaced passageways 41 which are spaced apart around the piston.

Within the groove 40 there is a seal ring 42 formed of rubber or other similar sealing material which fits closely around the piston stem 32.

Spaced beneath the head 32a the piston stem is provided with external longitudinal ribs, or splines 43 spaced apart therearound which intermesh with similar internal longitudinal ribs or splines 44 in the upper end of the lower body section 31. These splines allow relative longitudinal movement between the piston stem and body but prevent their relative rotation.

The body section 30, near its upper end, is internally reduced in diameter thus forming a cylinder 45.

The piston 38 is of an outside diameter to fit snugly within the cylinder 45 as it passes therethrough but it is to be noted that the inside diameter of the cylinder 45 is somewhat less than the corresponding inside diameter of the body of the tool. Therefore when the piston 38 is beneath the cylinder 45 there will be a continuous cylindrical chamber 46 within and beneath the cylinder 45 within the body which is completely filled with a suitable fluid such as heavy oil.

Obviously any attempt to force the piston through the cylinder 45 will be opposed by the liquid which is substantially non-compressible. Therefore to allow movement of the piston upwardly relative to the body, the restricted duct 39 has been provided.

In operation the tool may be assembled as shown in Figures 14, 15 and lowered into the well bore until the grapple is in position to engage the stuck pipe to be pulled.

Any conventional type of grapple may be employed. As illustrated the tool is in position for jarring upwardly.

Upon an upward pull of the string 28 the barrel 29 and body 30, 31 will be moved upwardly and the seal ring 42 will close the passageway 39 so as to place the fluid in the chamber 46 beneath the piston under compression. When the lower end of the cylinder 45 passes the upper end of the piston 38 there will be a clearance between said piston and the body 30, 31 so as to relieve said pressure and the tension of the drill stem will cause the upper end of the lower body suction 31 to strike against the head 32a thus imparting a sudden upward jar to the tool and to the stuck pipe to which the lower end of the grapple 34 is secured.

Upon downward movement of the string 28, the barrel and the body 30, 31 the operating fluid above the piston 38 will readily flow downwardly through the passageway 39, the groove 40 and the passageways 41 so as to set the tool in the position shown in Figures 14 and 15 for another upward jar, if the same be necessary.

The drawings and description illustrate and describe what is now considered to be a preferred form of the invention merely by way of illustration while it is contemplated that various changes may be made in the mechanical construction within the scope of the appended claims.

What I claim is:

1. A one way seal between two adjacent parts secured together and having a fluid passageway between them, one of said parts having a groove facing the other part, a sealing element having a circular cross section in the groove in engagement with said parts, said groove having a portion of greater depth mediate the sides of the groove than at one side thereof and forming a by-pass in communication with said passageway at the other side of said groove and opening into said groove between the sides thereof, said sealing element being of a smaller transverse diameter than the width of the groove and said element being yieldably movable in the groove into one position mediate the sides of the groove, under the influence of fluid pressure in one direction, to open the by-pass to permit the flow of said pressure fluid, and said sealing element being movable under the influence of fluid pressure in the other direction, into another position in engagement with the parts to seal said passageway against the flow of said pressure fluid through the passageway.

2. A one way seal between two adjacent parts secured together and having a passageway for fluid between them, one of said parts having an annular groove therein facing the other part, an annular sealing element in the groove in engagement with the parts, the radial cross section of said element being less than that of the groove, said groove having a by-pass communicating at one end with said passageway at one side of said groove and opening at the other end into said groove at a point between the sides thereof, said element being yieldably movable into one position mediate the ends of said by-pass, under the influence of fluid pressure in one direction, to open the by-pass and being yieldably engageable with the other side of said groove upon cessation of the fluid pressure in said one direction to close and seal said passageway against the flow of fluid in the other direction.

3. A one way seal between two adjacent parts having a passageway for fluid between them, one of said parts having an annular groove therein, facing the other part, an annular resilient sealing element in the groove, said groove having an annular portion of greater depth mediate the sides of the groove than at one side thereof, said portion forming a by-pass in communication with said passageway at one side of said groove and opening into the groove between the sides thereof, said sealing element being of less diameter, in cross section, than the width of the groove and being free to move into one position mediate the sides of the groove, under the influence of fluid pressure in one direction, to open the by-pass and being movable into another position in engagement with the parts, under the influence of fluid pressure in the opposite direction, to close and seal said passageway and yieldable means in the groove normally acting to hold said sealing element in said sealing position.

4. A device of the character described comprising, two adjacent parts secured together and having a fluid passageway between them, valve means for controlling the passage of fluid under pressure through said passageway, said valve means including an annular groove in one of said parts which faces the other and which forms a valve seat, said groove having an annular portion of greater depth mediate the sides of the groove than the depth of the groove at one side thereof, said portion forming a by-pass in communication with said passageway at the other side of the groove and opening into the groove between the sides thereof, a resilient sealing element in the seat, forming a valve, said sealing element being of less diameter, in cross section, than the width of the groove and being yieldably movable in the seat, under the influence of the pressure of fluid in one direction, to a position mediate the sides of the groove to open the by-pass to allow flow of said fluid through the passageway and said element being adapted to yieldingly engage the side of the groove beyond the opening of said by-pass therein upon cessation of the flow of the pressure fluid in said one direction to close and seal said passageway to prevent the flow of said fluid through the passageway in the other direction.

5. A one way seal between two adjacent parts having a passageway for fluid between them, one of said parts having an annular groove therein facing the other part, and said groove having a by-pass communicating at one end with said passageway at one side of the groove and opening into the groove mediate the sides thereof, an annular sealing element of resilient material in the groove whose diameter in the unstressed condition of the element is such as to cause the element to assume a position between the ends of the by-pass to open the by-pass to permit the flow of pressure fluid in one direction through said passageway, said sealing element being deformable under the influence of said pressure fluid in the other direction into a position to seal said passageway against the flow of said pressure fluid through the passageway.

6. A one way seal between two adjacent parts having a passageway for fluid between them, one of said parts having an annular groove therein facing the other part, said groove having inner and outer radially spaced walls and said one part having a by-pass communicating at its inner end with said passageway and opening at its outer end into said groove at a point between said walls, an annular, radially-expansible, sealing element in the groove which in the unstressed condition of the element fits said inner wall to open the by-pass to permit the flow of pressure fluid in one direction through the passageway, said element being expansible under the influence of said pressure fluid in the other direction to a position radially outwardly of the outer end of the by-pass to seal said passageway against the flow of pressure fluid through the passageway.

7. A one way seal between two adjacent parts having a passageway for fluid between them, one of said parts having an annular groove therein, said groove having spaced side walls and an annular bottom wall, said one of said parts also having a by-pass communicating at one end with said passageway and terminating at the other end in an opening in the bottom of the groove, an annular sealing element of resilient material in the groove movable, under the influence of the flow of pressure fluid in one direction, to a position between one of said side walls and said opening to open the by-pass to permit the flow of pressure fluid in said one direction through said passageway and adapted to yieldably engage the other of said side walls and the other of said parts beyond said opening to close the by-pass and seal said passageway against the flow of pressure fluid in the other direction through the passageway.

LYNN W. STORM.

REFERENCES CITED

The following references are of record in the file of this patent:

UNITED STATES PATENTS

| Number | Name | Date |
|---|---|---|
| Re. 2,763 | Wood | Sept. 10, 1867 |
| 967,514 | Groh | Aug. 16, 1910 |
| 1,366,151 | Astrom | Jan. 18, 1921 |
| 1,861,755 | Rasmussen | June 7, 1932 |
| 2,313,284 | Valentine | Mar. 9, 1943 |
| 2,366,080 | Wingate | Dec. 26, 1944 |
| 2,404,547 | Strid | July 23, 1946 |
| 2,481,482 | Green | Sept. 13, 1949 |

FOREIGN PATENTS

| Number | Country | Date |
|---|---|---|
| 361,646 | Germany | Oct. 17, 1922 |
| 640,530 | Germany | Jan. 6, 1937 |